US012566057B2

(12) United States Patent
Volker

(10) Patent No.: US 12,566,057 B2
(45) Date of Patent: Mar. 3, 2026

(54) METHOD FOR INITIALIZING AN ANGLE-OF-ROTATION MEASUREMENT SYSTEM, AND ANGLE-OF-ROTATION MEASUREMENT SYSTEM

(71) Applicant: FRABA B.V., Heerlen (NL)

(72) Inventor: Hanno Volker, Aachen (DE)

(73) Assignee: FRABA B.V., Sg Heerlen (NL)

( * ) Notice: Subject to any disclaimer, the term of this patent is extended or adjusted under 35 U.S.C. 154(b) by 169 days.

(21) Appl. No.: 18/553,994

(22) PCT Filed: Apr. 7, 2021

(86) PCT No.: PCT/EP2021/059017
§ 371 (c)(1),
(2) Date: Oct. 5, 2023

(87) PCT Pub. No.: WO2022/214167
PCT Pub. Date: Oct. 13, 2022

(65) Prior Publication Data
US 2024/0183648 A1     Jun. 6, 2024

(51) Int. Cl.
*G01B 7/30* (2006.01)

(52) U.S. Cl.
CPC ...................................... *G01B 7/30* (2013.01)

(58) Field of Classification Search
None
See application file for complete search history.

(56) References Cited

U.S. PATENT DOCUMENTS

| | | | | |
|---|---|---|---|---|
| 5,376,870 A | * | 12/1994 | Ueda ....................... | H02P 6/085 |
| | | | | 318/400.4 |
| 7,800,359 B2 | * | 9/2010 | Goto ......................... | G01L 3/10 |
| | | | | 73/514.39 |
| 7,876,092 B2 | * | 1/2011 | Sasaki .................. | G01D 5/2497 |
| | | | | 324/207.25 |
| 8,250,910 B2 | * | 8/2012 | Rolew ................... | G01P 13/045 |
| | | | | 73/114.26 |

(Continued)

FOREIGN PATENT DOCUMENTS

| | | |
|---|---|---|
| DE | 10 2004 062 448 A1 | 1/2006 |
| DE | 10 2008 032 046 A1 | 1/2010 |

(Continued)

*Primary Examiner* — Richard Isla

(74) *Attorney, Agent, or Firm* — Norman B. Thot

(57)        ABSTRACT

A method for initializing a rotation angle measuring system. The method includes setting a predefined initialization angular position of a rotor unit relative to a stator unit, reading an actual partial rotation count value from a data storage, wherein the actual partial rotation count value indicates a number of partial rotations ($360°/N$) of the rotor unit relative to the stator unit, where $N=2^n$ ($n=1, 2, 3 \ldots$), determining an actual subsegment value from the actual partial rotation count value, wherein the actual subsegment value indicates in which ($360°/N$) subsegment of a full rotation the rotor unit is located relative to the stator unit, and increasing or decreasing the actual subsegment value stored in the data storage if the actual subsegment value does not match a target subsegment value which is assigned to the predefined initialization angular position.

6 Claims, 5 Drawing Sheets

(56)　　　　　　References Cited

U.S. PATENT DOCUMENTS

| | | | | |
|---|---|---|---|---|
| 8,766,625 | B2 * | 7/2014 | Mehnert .............. | G01D 5/2033 |
| | | | | 324/207.2 |
| 11,460,322 | B2 * | 10/2022 | Hallermann ........... | G01D 5/145 |
| 2010/0010766 | A1 | 1/2010 | Kammer et al. | |
| 2011/0016960 | A1 * | 1/2011 | Debrailly ............... | H02K 29/08 |
| | | | | 73/115.07 |
| 2015/0130450 | A1 | 5/2015 | Gehringer et al. | |
| 2015/0153203 | A1 | 6/2015 | Simon et al. | |
| 2016/0223362 | A1 * | 8/2016 | Werner .............. | G01D 5/24419 |
| 2019/0368901 | A1 | 12/2019 | Fujita et al. | |
| 2020/0039579 | A1 | 2/2020 | Fujita et al. | |
| 2021/0302201 | A1 | 9/2021 | Hallermann et al. | |

FOREIGN PATENT DOCUMENTS

| | | | |
|---|---|---|---|
| DE | 10 2012 012 874 | A1 | 1/2014 |
| JP | 64-15609 | A | 1/1989 |
| JP | 2004-274804 | A | 9/2004 |
| JP | 2013-046547 | A | 3/2013 |
| JP | 2019-207205 | A | 12/2019 |
| JP | 2019-215310 | A | 12/2019 |
| JP | 2020-24104 | A | 2/2020 |
| JP | 2020-165951 | A | 10/2020 |
| JP | 2021-21682 | A | 2/2021 |
| WO | WO 2020/016098 | A1 | 1/2020 |

* cited by examiner

METHOD FOR INITIALIZING AN ANGLE-OF-ROTATION MEASUREMENT SYSTEM, AND ANGLE-OF-ROTATION MEASUREMENT SYSTEM

CROSS REFERENCE TO PRIOR APPLICATIONS

This application is a U.S. National Phase application under 35 U.S.C. § 371 of International Application No. PCT/EP2021/059017, filed on Apr. 7, 2021. The International Application was published in German on Oct. 13, 2022 as WO 2022/214167 A1 under PCT Article 21(2).

FIELD

The present invention is directed to a method for initializing a rotation angle measuring system and to a rotation angle measuring system for detecting a rotational movement of a shaft, comprising a rotatable rotor unit which is designed to be mounted so as to rotate with the shaft and which has a plurality of permanent-magnetic excitation magnets, a stationary stator unit with a Wiegand multiturn sensor, a data storage and an evaluation unit, and a singleturn sensor unit via which an angular position of the rotor unit relative to the stator unit can be detected, wherein the evaluation unit is connected to the Wiegand multiturn sensor, to the singleturn sensor unit, and to the data storage, and is designed to determine an actual partial rotation count value, which indicates a number of $(360°/N)$ partial rotations of the rotor unit relative to the stator unit, where $N=2^n$ ($n=1$, 2, 3, ...), and an actual angular position value, which indicates a relative angular position of the rotor unit relative to the stator unit, and to store the determined actual partial rotation count value and the determined actual angular position value in the data storage.

BACKGROUND

Such rotation angle measuring systems have previously been described and are in particular used to control and monitor electric motors, especially servo motors, in machines, plants or vehicles. Rotation angle measuring systems are often also referred to as an angle measuring apparatus, an angle-of-rotation measurement system, a rotation angle sensor or a rotary encoder.

In rotation angle measuring systems with a Wiegand multiturn sensor, in particular in rotation angle measuring systems in which the rotor unit and stator unit are constituted by separate assemblies, uncontrolled movements of the rotor unit with the permanent-magnetic excitation magnets relative to the stator unit with the Wiegand multiturn sensor during transport and installation of the rotation angle measuring system can trigger unintentional counting pulses in the Wiegand multiturn sensor, which typically cause an incrementing or a decrementing of the actual partial rotation count value stored in the data storage, even without an external power supply of the rotation angle measuring system. Such rotation angle measuring systems can therefore have an undefined actual partial rotation count value after installation at the place of use.

Since the actual partial rotation count value stored in the data storage is typically only incremented or decremented during operation of the rotation angle measuring system, for the proper functioning of the rotation angle measuring system, it is important that the data storage has a defined actual partial rotation count value after installation. Rotation angle measuring systems are therefore typically initialized after installation in order to set a defined initial state.

SUMMARY

An aspect of the present invention is to provide a rotation angle measuring system which can be initialized reliably and in a simple manner.

In an embodiment, the present invention provides a method for initializing a rotation angle measuring system. The method includes setting a predefined initialization angular position of a rotor unit relative to a stator unit, reading an actual partial rotation count value from a data storage, wherein the actual partial rotation count value indicates a number of partial rotations $(360°/N)$ of the rotor unit relative to the stator unit, where $N=2^n$ ($n=1$, 2, 3 ...), determining an actual subsegment value from the actual partial rotation count value, wherein the actual subsegment value indicates in which $(360°/N)$ subsegment of a full rotation the rotor unit is located relative to the stator unit, and increasing or decreasing the actual subsegment value stored in the data storage if the actual subsegment value does not match a target subsegment value which is assigned to the predefined initialization angular position.

BRIEF DESCRIPTION OF THE DRAWINGS

The present invention is described in greater detail below on the basis of embodiments and of the drawings in which.

DETAILED DESCRIPTION

Figure 1:
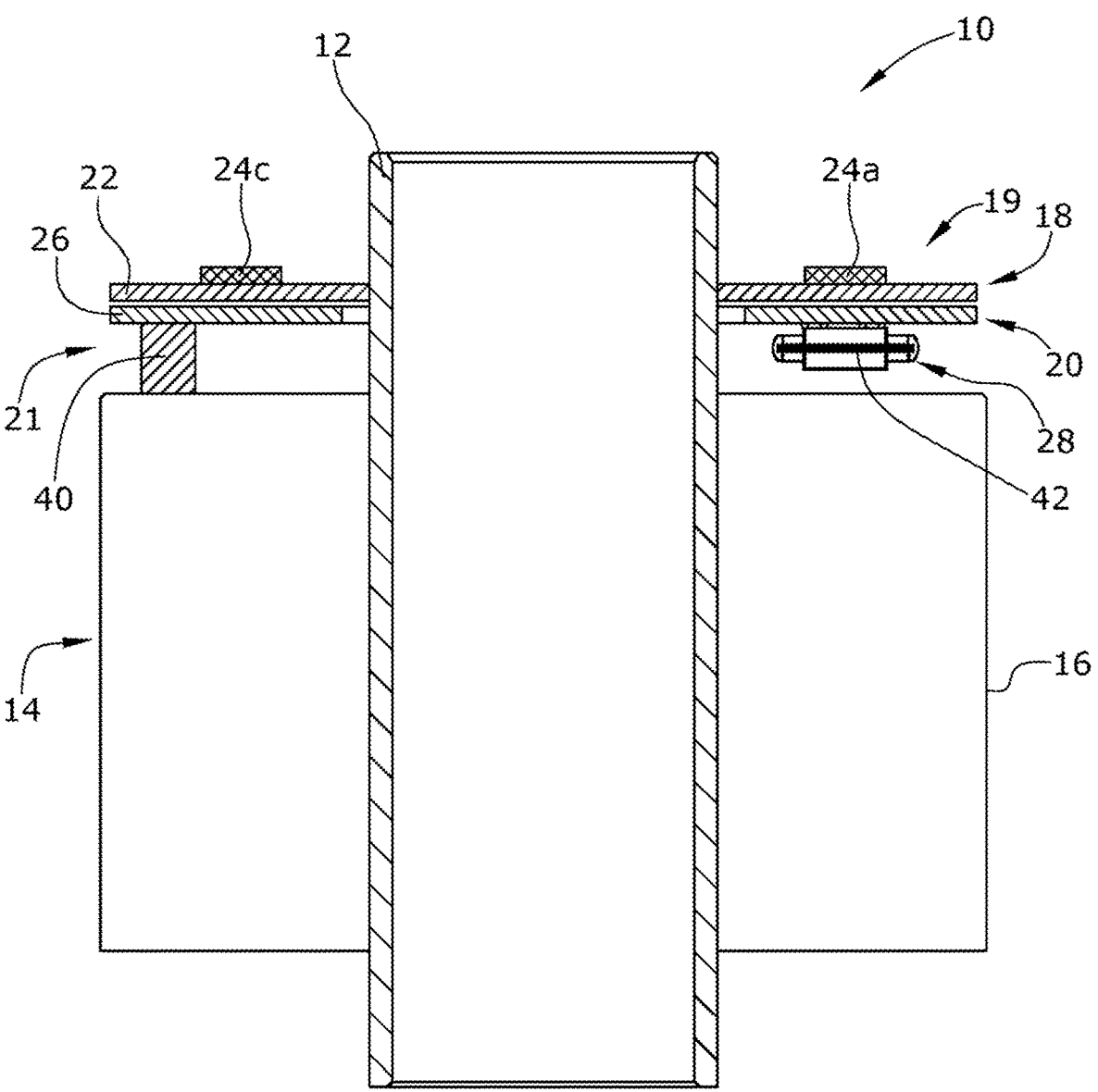
FIG. 1 shows a sectional view of a rotation angle measuring system according to the present invention.
Figure 2:
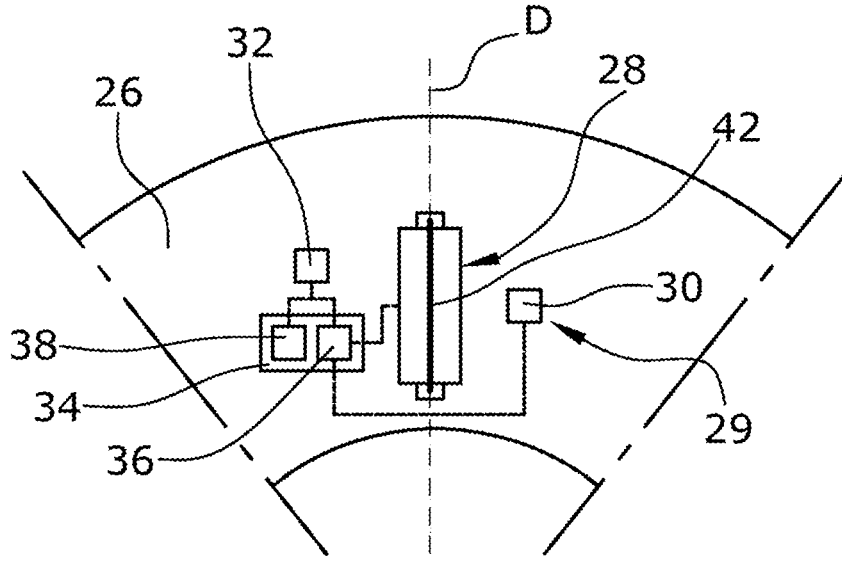
FIG. 2 shows a part of a stator unit of the rotation angle measuring system of FIG. 1.

In the method for initializing the rotation angle measuring system according to the present invention, after the rotation angle measuring system has been mounted on the shaft that is to be detected, a predefined initialization angular position of the rotor unit, which is mounted so as to rotate with the shaft, is set relative to the stationary stator unit of the rotation angle measuring system. One single initialization angular position or several typically substantially equidistantly distributed initialization angular positions can thereby be predefined. The number of predefined initialization angular positions can, for example, correspond to the number of excitation magnets of the rotor unit. The at least one initialization angular position can, for example, be predefined so that an excitation magnet of the rotor unit is arranged adjacent to the Wiegand multiturn sensor in each initialization angular position. In the case of several initialization angular positions, the predefined initialization angular position that is closest in the direction of rotation of the shaft is typically set. The at least one initialization angular position can also be defined via an initialization angular interval, in which case any angular position within the initialization angular interval constitutes an initialization angular position.

When the predefined initialization angular position of the rotor unit relative to the stator unit is set, the stored actual partial rotation count value, which indicates the number of ($360°/N$) partial rotations of the rotor unit relative to the stator unit, where $N=2^n$ (n=1, 2, 3, . . . ), is read out from the data storage of the rotation angle measuring system. The actual partial rotation count value thus indicates at least the number of half rotations (n=1), but can also have a higher resolution than half rotations, e.g., can indicate a number of quarter rotations (n=2) or eighth rotations (n=3).

An unambiguous actual subsegment value can in each case be determined from the actual partial rotation count value read out which indicates in which ($360°/N$)-subsegment of the total of N ($360°/N$)-subsegments of a full rotation the rotor unit is located relative to the stator unit. Each subsegment here comprises an angular position range of ($360/N°$). Typically, the first ($360°/N$) subsegment comprises the angular position range from 1° to ($360/N°$), the second ($360°/N$) subsegment comprises the angular position range from $[(360/N)+1]°$ to $[2-(360/N)]°$, etc.

According to the present invention, the actual subsegment value is determined from the read-out actual partial rotation count value and is compared with a target subsegment value which is assigned to the respective initialization angular position. Since the angular position of the rotor unit relative to the stator unit is unambiguously known for each predefined initialization angular position, an unambiguous target subsegment value is additionally assigned to each predefined initialization angular position. In the case of N=2, for example, the actual subsegment value can be determined simply by evaluating a single bit of the read-out actual partial rotation count value, for example, by evaluating the last bit of the read-out actual partial rotation count value. If the set initialization angular position is within the angular position range of the first ($360°/N$) subsegment, the target subsegment value indicates the first subsegment, if the set initialization angular position is within the angular position range of the second ($360°/N$) subsegment, the target subsegment value indicates the second subsegment, etc.

If the actual subsegment value which is determined from the read-out actual partial rotation count value does not match the target subsegment value, the actual partial rotation count value stored in the data storage must be corrected. The correction is made by increasing or decreasing the actual partial rotation count value which is stored in the data storage so that the actual subsegment value which is indicated by the stored actual partial rotation count value thereafter matches the target subsegment value. The actual partial rotation count value is typically either increased or decreased by a value $X<(N/2)$. In the sense of the present invention, also storing a partial rotation count value offset, which is added to the stored actual partial rotation count value or subtracted from the stored actual partial rotation count value when the stored actual partial rotation count value is read out, is to be here understood as increasing or decreasing the actual partial rotation count value stored in the data storage. The stored actual partial rotation count value remains unchanged if the actual subsegment value which is determined from the read-out actual partial rotation count value matches the target subsegment value.

The method for initializing the rotation angle measuring system according to the present invention provides in a simple manner that a defined actual partial rotation count value is stored in the data storage after initialization, which in particular indicates the correct subsegment position of the rotor unit relative to the stator unit. The method according to the present invention therefore allows a simple and reliable initialization of the rotation angle measuring system.

A rotational movement of the rotor unit relative to the stator unit can, for example, be started to set the predefined initialization angular position. This is typically performed by driving the shaft. During the rotational movement, an actual angular position value, which indicates the current relative angular position of the rotor unit with respect to the stator unit, is determined (essentially continuously) via the singleturn sensor unit, in a manner well known from the prior art. The determined actual angular position value is compared with at least one predefined initialization angular position value, wherein each initialization angular position value is assigned to one unambiguous predefined initialization angular position. If the determined actual angular position value matches a predefined initialization angular position value, the initialization angular position which is assigned to this initialization angular position value is considered to be set and the above-mentioned method steps, which follow the setting of the initialization angular position, are executed. Since these following process steps can generally be executed very quickly, it is not inevitably necessary to stop the rotational movement of the rotor unit when the initialization angular position is reached. This allows for a simple and reliable setting of the predefined initialization angular position. In the case of several predefined initialization angular positions, the closest predefined initialization angular position in the direction of rotation is here automatically set so that the rotation of the shaft that is required to initialize the rotation angle measuring system is minimized.

As is well known from the prior art, a so-called Wiegand pulse is triggered in Wiegand multiturn sensors by a polarity change of the excitation magnetic field which is generated by the permanent-magnetic excitation magnets at the location of the Wiegand multiturn sensor. The Wiegand pulse is detected by the Wiegand multiturn sensor and is evaluated, in particular to determine the actual partial rotation count value. It is also known that so-called "runt" pulses can occur in Wiegand multiturn sensors. This refers to the case where, after a previous change in the direction of rotation, no Wiegand pulse or only a Wiegand pulse which is not strong enough for detection is generated by the polarity change of the excitation magnetic field which occurs during the rotation of a permanent-magnetic excitation magnet past the Wiegand multiturn sensor.

An actual pulse polarity value, which indicates the polarity of the last Wiegand pulse triggered in the Wiegand multiturn sensor, is therefore advantageously read out from a data storage after the setting of the predefined initialization angular position and prior to the previously described checking of the actual partial rotation count value, and the read-out actual pulse polarity value is compared with a target pulse polarity value which is assigned to the set initialization angular position. The at least one initialization angular position is predefined so that a permanent-magnetic excitation magnet of the rotor unit is arranged adjacent to the Wiegand multiturn sensor in each initialization angular position so that, for each initialization angular position, the target pulse polarity value is unambiguously defined, irrespective of the direction of rotation of the shaft, by the magnetic polarity of the excitation magnet that is arranged adjacent to the Wiegand multiturn sensor in the initialization angular position. The at least one initialization angular position is predefined so that a permanent-magnetic excitation magnet of the rotor unit is arranged adjacent to the Wiegand multiturn sensor in each initialization angular position, so that for each initialization angular position, the target pulse polarity value is unambiguously defined, irrespective of the direction of rotation of the shaft, by the magnetic polarity of the excitation magnet that is arranged adjacent to the Wiegand multiturn sensor in the initialization angular position, respectively. If the read-out actual pulse polarity value does not match the target pulse polarity value of the set initialization angular position, this means that a "runt" pulse has occurred. The actual partial rotation count value cannot in this case be reliably checked and corrected as previously described. The present invention therefore provides that in this case, the rotor unit is rotated to the next initialization angular position in the direction of rotation. If only one initialization angular position is predefined, the rotor unit is here rotated by one full rotation. Since it is impossible that two "runt" pulses occur in succession if the direction of rotation is maintained, a Wiegand pulse that is not "runt" is always triggered when the rotor unit is rotated to the next initialization angular position, so that a check and possibly a correction of the actual partial rotation count value can be reliably executed after the rotation. This allows for a particularly reliable initialization of the rotation angle measuring system.

The rotation angle measuring system according to the present invention comprises a rotatable rotor unit, which is designed to be mounted so as to rotate with the shaft, and a stationary stator unit. The rotor unit comprises several permanent-magnetic excitation magnets, and the stator unit comprises a Wiegand multiturn sensor, a data storage, and an evaluation unit.

The permanent-magnetic excitation magnets of the rotor unit are arranged along the circumference of the rotor unit so that the polarity of the excitation magnetic field generated by the excitation magnets at the location of the Wiegand multiturn sensor changes at least twice during one full rotation of the rotor unit. At least two Wiegand pulses are consequently generated in the Wiegand multiturn sensor during one full rotation of the rotor unit, so that the number of $(360°/N)$ partial rotations $(N=2^n, n=1,2,3, \ldots )$ of the rotor unit relative to the stator unit can be determined from the number of Wiegand pulses in a manner well known from the prior art. The rotor unit typically comprises a disc-shaped carrier which can be mounted on the shaft and to which the multiple excitation magnets are attached.

The rotation angle measuring system according to the present invention also comprises a singleturn sensor unit via which an angular position of the rotor unit relative to the stator unit can be detected. The singleturn sensor unit generally comprises a stationary sensor which is assigned to the stator unit and a sensor which is arranged on the rotor unit, wherein the sensors functionally interact so that the angular position of the rotor unit relative to the stator unit can be detected. The singleturn sensor unit can in principle be any singleturn sensor unit known from the prior art via which the angular position of the rotor unit relative to the stator unit can be detected. The singleturn sensor unit can, for example, be a capacitive singleturn sensor unit, an optical singleturn sensor unit or a mechanical singleturn sensor unit known from the prior art.

The data storage can in principle be any data storage known from the prior art and can be constituted by any number of volatile and/or non-volatile storage components.

The data storage typically comprises at least one volatile storage component and one non-volatile storage component.

The evaluation unit is designed (as known from the prior art) to determine an actual partial rotation count value, which indicates the number of $(360°/N)$ partial rotations of the rotor unit relative to the stator unit, and an actual angular position value, which indicates a relative angular position of the rotor unit relative to the stator unit. The evaluation unit is also designed to store the determined actual partial rotation count value and the determined actual angular position value in the data storage. The evaluation unit can in principle be constituted by any number of components interacting with each other. The evaluation unit can, for example, be constituted (as known from the prior art) by a special electrical circuit and/or by an accordingly programmed integrated circuit or microcontroller.

According to the present invention, the rotation angle measuring system also comprises an initialization unit to which a target subsegment value is predefined, wherein the target subsegment value is typically stored in the data storage. The initialization unit according to the present invention is designed to read out the actual partial rotation count value from the data storage, and to determine from the actual partial rotation count value an actual subsegment value which indicates in which $(360°/N)$ subsegment of a full rotation the rotor unit is located with respect to the stator unit. The initialization unit according to the present invention is also designed to increase or decrease the actual partial rotation count value which is stored in the data storage if the actual subsegment value does not match the target subsegment value. The actual partial rotation count value is here increased or decreased so that the actual subsegment value indicated by the stored actual partial rotation count value afterwards matches the target subsegment value. The initialization unit according to the present invention is typically designed to either increase or decrease the actual partial rotation count value by a value $X<(N/2)$. In the sense of the present invention, also storing a partial rotation count value offset, which is added to the stored actual partial rotation count value or subtracted from the stored actual partial rotation count value when the stored actual partial rotation count value is read out, is to be here understood as increasing or decreasing the actual partial rotation count value stored in the data storage. The partial rotation count value offset is typically stored in a non-volatile storage component of the data storage here so that it is still available even after an interruption of the power supply to the rotation angle measuring system. The initialization unit can, for example, be constituted by an accordingly programmed integrated circuit or microcontroller.

The initialization unit according to the present invention allows the previously described method for initializing the rotation angle measuring system according to the present invention to be performed, which provides that a defined actual partial rotation count value, which indicates the correct partial segment position of the rotor unit relative to the stator unit, is stored in the data storage after initialization. The initialization unit according to the present invention thus provides a rotation angle measuring system that can be initialized reliably and in a simple manner.

The rotor unit can, for example, comprise at least four permanent-magnetic excitation magnets so that the polarity of the excitation magnetic field, which is generated by the excitation magnets at the location of the Wiegand multiturn sensor, changes at least four times during one full rotation of the rotor unit and consequently at least four Wiegand pulses are generated in the Wiegand multiturn sensor during one full rotation of the rotor unit. This allows the definition of several initialization angular positions so that only a relatively small rotation of the shaft is required to execute the method for initialization of the rotation angle measuring system according to the present invention. The at least four excitation magnets also allow a particularly reliable and precise detection of the rotational movement of the shaft.

The rotor unit of the rotation angle measuring system is advantageously constituted by a first assembly, and the stator unit of the rotation angle measuring system is advantageously constituted by a separate second assembly, wherein the first assembly and the second assembly can be mounted on the shaft one after the other. This allows for a simple mounting of the rotation angle measuring system on the shaft.

An embodiment of a rotation angle measuring system according to the present invention is described below with reference to the enclosed drawings.

FIG. 1 shows a rotation angle measuring system 10 for detecting the rotational movement of a shaft 12. In the present embodiment, the shaft 12 is a hollow shaft which extends substantially in an axial direction, and which is driven by a drive motor 14 with a static motor housing 16. The rotation angle measuring system 10 comprises a rotor unit 18 and a stator unit 20. In the present embodiment, the rotor unit is constituted by a first assembly 19, and the stator unit 20 is constituted by a second assembly 21, wherein the first assembly 19 and the second assembly 21 are mounted on the shaft 12 one after the other during installation of the rotation angle measuring system 10.

The rotor unit 18 comprises a ring-disc-shaped rotor circuit board 22 which radially surrounds the shaft 12 and which is directly attached to the shaft 12. The rotor unit 18 is thus connected to the shaft 12 so as to rotate therewith. Four permanent-magnetic excitation magnets 24a-d are arranged on the rotor circuit board 22. The excitation magnets 24a-d in the present embodiment are each diametrically magnetized disc magnets and are arranged so that their magnetization direction extends substantially parallel to a radial direction, respectively, i.e., so that the magnetic poles N,S are each arranged adjacent to each other in the radial direction. The excitation magnets 24a-d are in particular arranged so that circumferentially adjacent excitation magnets 24a-d have opposite magnetization directions.

The stator unit 20 comprises a ring-shaped stator circuit board 26 which radially surrounds the shaft 12. A Wiegand multiturn sensor 28, a data storage 32, and an integrated circuit 34, which constitutes an evaluation unit 36 and an initialization unit 38, are arranged on the stator circuit board 26. The stator unit 20 in the present embodiment is attached to the motor housing 16 via several fastening devices 40.

The Wiegand multiturn sensor 28 is arranged so that a Wiegand wire 42 of the Wiegand multiturn sensor 28 extends in a radial direction. The Wiegand multiturn sensor 28 is arranged at substantially the same radial distance from the shaft 12 as the excitation magnets 24a-d so that the excitation magnetic field generated by the excitation magnets 24a-d can be reliably detected by the Wiegand multiturn sensor 28.

The rotation angle measuring system 10 also comprises a singleturn sensor unit 29. In the present embodiment, the singleturn sensor unit 29 comprises an optical singleturn sensor 30, which is arranged on the stator circuit board 26, and a (not shown) code track which is formed on the rotor unit 18 and which is scanned by the optical singleturn sensor 30.

Four initialization angular position values W1-4 are stored in the data storage 32, wherein, in the present embodiment, W1=45°, W2=135°, W3=2250 and W4=315°. A target subsegment value HS1-4, which indicates in which (360°/N) subsegment of a full rotation the rotor unit 18 is located relative to the stator unit 20, is furthermore stored in the data storage 32 for each initialization angular position value W1-4. N=2 in the present embodiment so that the target subsegment value HS1-4 indicates whether the rotor unit 18 is located in a first half segment (HS=1:0° to 180°) or in a second half segment (HS=2:1800 to 360°) of the full rotation with respect to the stator unit 20 in the respective initialization angular position. Consequently, for the present embodiment, HS1=HS2=1 and HS3=HS4=2. A target pulse polarity value PP1-4, which indicates which polarity (PP=1: excitation magnet north pole outside; PP=2: excitation magnet south pole outside) the last Wiegand pulse triggered in the Wiegand multiturn sensor 28 should have for the respective initialization angular position, is also stored in the data storage 32 for each initialization angular position value W1-4. Consequently, for the present embodiment, PP1=PP3=2 and PP2=PP4=1.

The evaluation unit 36 is connected with the Wiegand multiturn sensor 28, the optical singleturn sensor 30, and the data storage 32. The evaluation unit 36 is designed to determine an actual partial rotation count value Un and an actual angular position value Wn by evaluating the sensor signals from the Wiegand multiturn sensor 28 and the optical singleturn sensor 30, wherein the actual partial rotation count value Un indicates a current number of (360°/N) partial rotations, here a current number of half rotations, of the rotor unit 18 relative to the stator unit 20 and thus indicates a number of half rotations of the shaft 12, and wherein the actual angular position value Wn indicates a current angular position of the rotor unit 18 relative to the stator unit 20. The evaluation unit 36 is also designed to determine an actual pulse polarity value PPn which indicates what polarity the last non-run Wiegand pulse triggered in the Wiegand multiturn sensor 28 had. The evaluation unit 36 is also designed to store the determined actual partial rotation count value Un, the determined actual angular position value Wn, and the determined actual pulse polarity value PPn in the data storage 32.

The initialization unit 38 can be activated as needed for initializing the rotation angle measuring system 10, for example, by setting a corresponding bit switch in the data storage 32.

The initialization unit 38 is designed to set a predefined initialization angular position. For this purpose, the initialization unit 38 is designed to read out all initialization angular position values W1-4 from the data storage 32 and to provide (directly or indirectly) a start signal to the drive motor 14 in order to start a rotational movement of the shaft 12 and thus of the rotor unit 18 relative to the stator unit 20. The initialization unit 38 is designed to read out the actual angular position value Wn substantially continuously from the data storage 32 and to compare it with the initialization angular position values W1-4. The initialization unit 38 is designed to provide (directly or indirectly) a stop signal to the drive motor 14 in order to stop the rotational movement of the shaft 12 and thus of the rotor unit 18 relative to the stator unit 20 if the read-out actual angular position value Wn matches an initialization angular position value W1-4.

The initialization unit 38 is also designed to execute a check with regard to a "runt" pulse. For this purpose, the initialization unit 38 is designed to read out the target pulse polarity value P1-4, which is assigned to the previously set initialization angular position, and the actual pulse polarity value PPn, from the data storage 32 and to compare the read-out actual pulse polarity value PPn with the read-out target pulse polarity value P1 4.

The initialization unit 38 is also designed to set the next initialization angular position PP1-4 if the actual pulse polarity value PPn does not match the read-out target pulse polarity value P1-4. For this purpose, the initialization unit 38 is in particular designed to (directly or indirectly) provide a start signal to the drive motor 14 in order to start a rotational movement of the shaft 12, to substantially continuously read out the actual angular position value Wn from the data storage 32 and to compare it with the initialization angular position values W1-4, and to (directly or indirectly) provide a stop signal to the drive motor 14 in order to stop the rotational movement of the shaft 12 if the read-out actual angular position value Wn matches one of the determined initialization angular position values W1-4.

The initialization unit 38 is also designed to check the actual partial rotation count value Un stored in the data storage 32 and to correct it if necessary. For this purpose, the initialization unit 38 is designed to read out the actual partial rotation count value Un and the target subsegment value HS1-4, which is assigned to the set initialization angular position, from the data storage and to determine an actual subsegment value HSn, which indicates in which (360°/N) subsegment of a full rotation the rotor unit 18 is located relative to the stator unit 20, from the actual partial rotation count value Un by evaluating the read-out actual partial rotation count value Un. The actual subsegment value HSn in the present embodiment thus indicates whether the rotor unit 18 is located in the first half segment or in the second half segment of the full rotation relative to the stator unit 20. An odd actual partial rotation count value Un here results in the actual partial segment value HSn=1 (first half segment), and an even actual partial rotation count value Un here results in the actual partial segment value HSn=2 (second half segment). The initialization unit 38 is also designed to compare the determined actual subsegment value HSn with the read-out target subsegment value HS1-4, and to increase the actual subrotation count value Un, which is stored in the data storage 32, by a value X=N/2=1 (corresponds to one half rotation) or to alternatively decrease it by X=N/2=1 if the determined actual subsegment value HSn does not match the read-out target subsegment value HS1-4.

Figure 3:
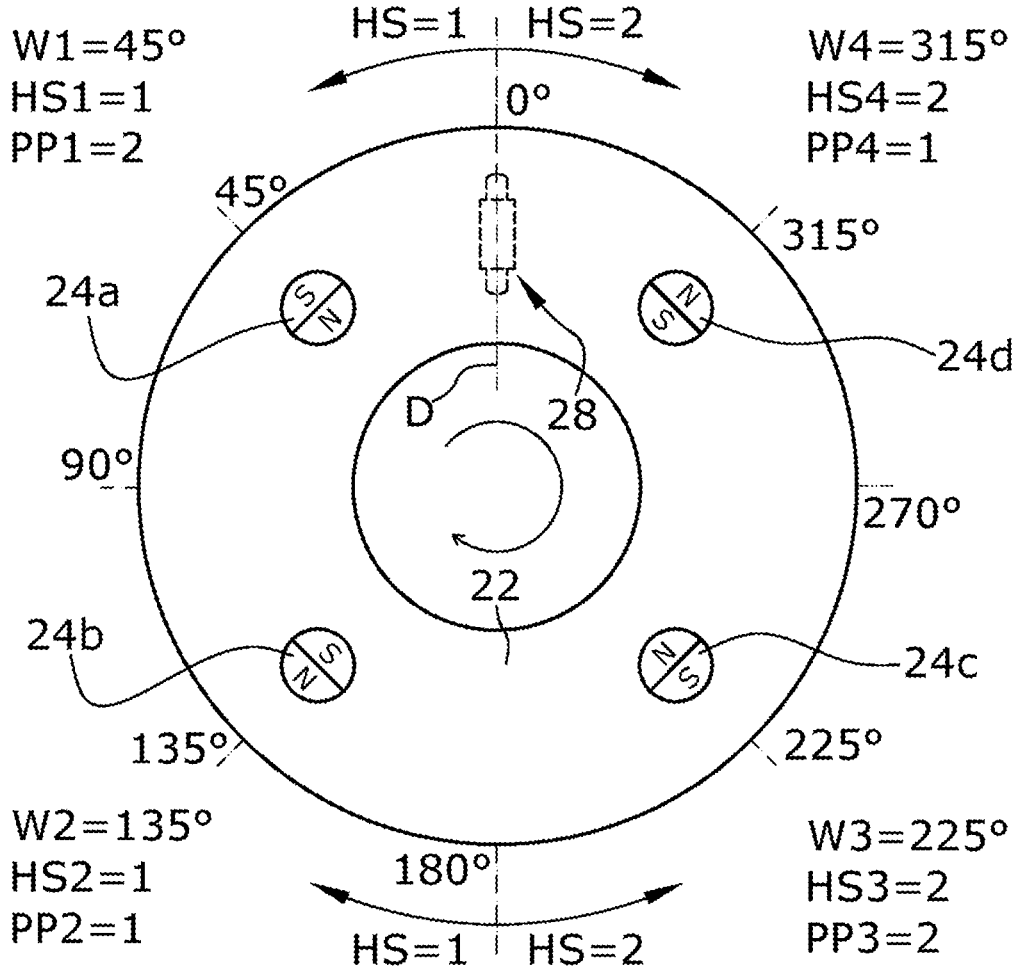
FIG. 3 shows a top view on a rotor unit of the rotation angle measuring system of FIG. 1, wherein the rotor unit is arranged in a zero angular position.

FIG. 3 shows the rotor unit 18 in a zero actual angular position (Wn=0°) for illustration of the individual values. An angle scale is drawn on the radial outside of the rotor unit 18, whereby the respective actual angular position value Wn can be determined for each rotational position of the rotor unit 18 by projecting the Wiegand wire extension direction D of the stationary Wiegand multiturn sensor 28 onto the (virtually rotated) angle scale. FIG. 3 also shows the four angular positions corresponding to the stored initialization angular position values WS1-4, each with the respective target subsegment value HS1-4 and the respective target pulse polarity value PP1-4.

Figure 4:
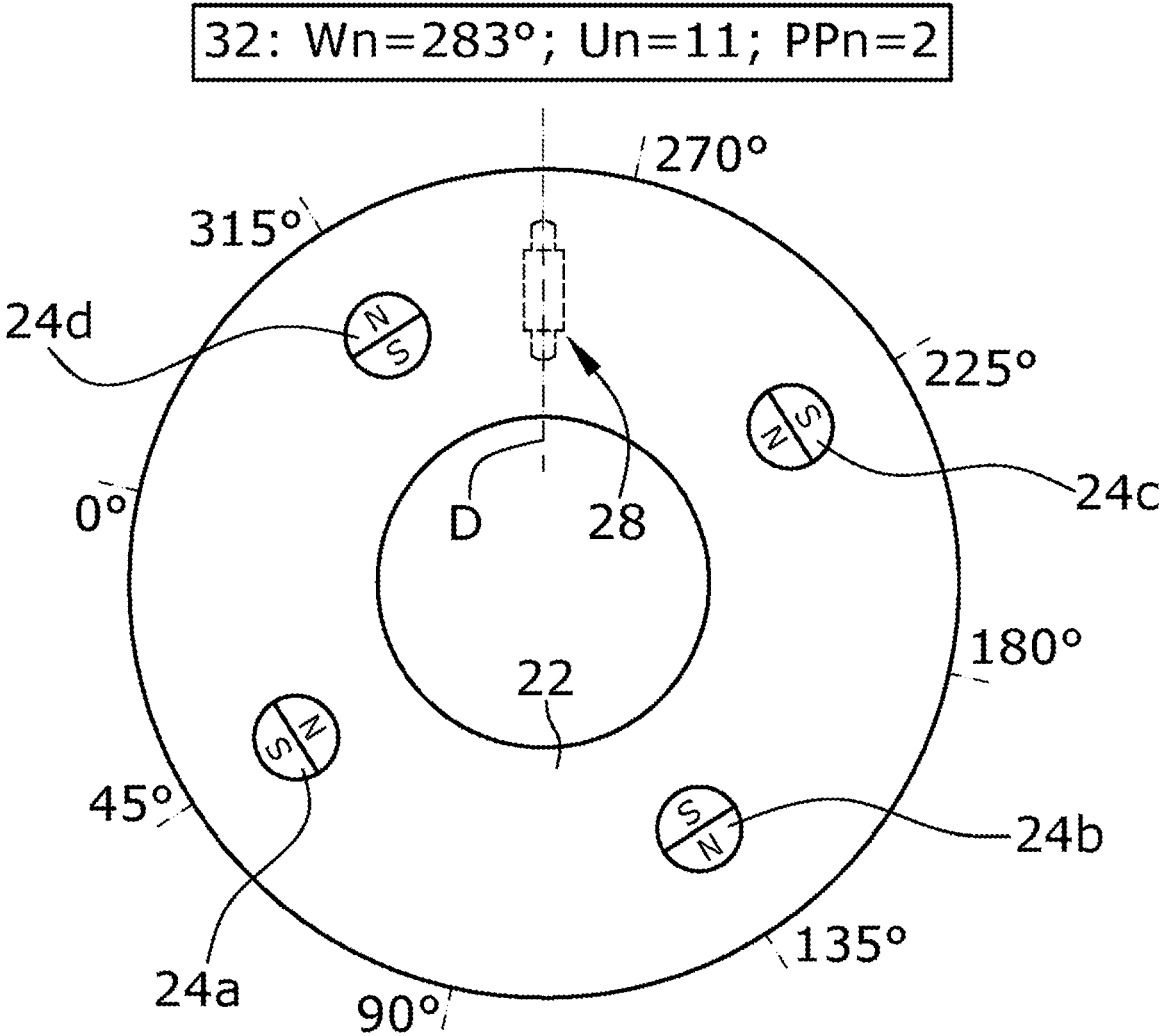
FIG. 4 shows the rotor unit of FIG. 3 in an initial angular position after installation of the rotation angle measuring system on a shaft, and shows values stored in a data storage after installation.

FIG. 4 shows the rotor unit 18 in an exemplary initial angular position after the rotation angle measuring system 10 has been installed on the shaft 12, wherein the actual angular position value Wn=283°, the actual partial rotation count value Un=11, and the actual pulse polarity value PPn=2 are stored in the data storage 32.

According to the present invention, after the installation of the rotation angle measuring system 10 on the shaft 12, the initialization unit 38 is activated to execute an initialization of the rotation angle measuring system 10.

For setting an initialization angular position which is predefined by the initialization angular position values W1-4, the initialization unit 38 provides the start signal to the drive motor 14 in order to start a rotational movement of the shaft 12 and thus of the rotor unit 18 relative to the stator unit 20 in a clockwise direction. During the rotational movement, the actual partial rotation count value Un, the actual angular position value Wn, and the actual pulse polarity value PPn, are substantially continuously determined by the evaluation unit 36 and stored in the data storage 32. The initialization unit 38 reads out the actual angular position value Wn, which is stored in the data storage 32, and compares the read-out actual angular position value Wn with the initialization angular position values W1-4 which are also read out from the data storage 32. If the read actual angular position value Wn matches one of the initialization angular position values W1-4, the initialization unit 38 provides the stop signal to the drive motor 14 in order to stop the rotational movement of the shaft 12.

Figure 5:
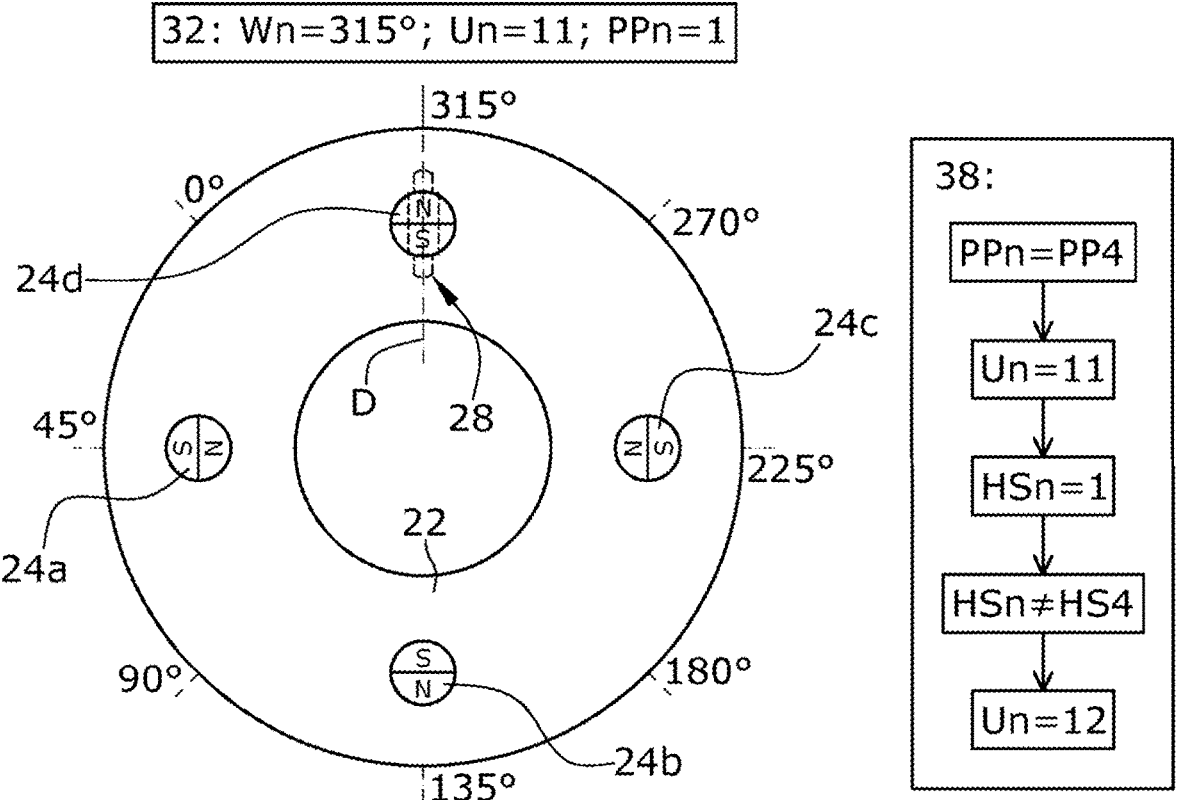
FIG. 5 shows the rotor unit of FIG. 3 rotated to an initialization angular position, the values stored in the data storage after the rotation, and a flow chart of a method for initializing the rotation angle measuring system which is executed by an initialization unit of the rotation angle measuring system.

Starting from the initial angular position with the actual angular position value Wn=283° shown in FIG. 4, the initialization angular position which corresponds to the fourth initialization angular position value W4=3150 shown in FIG. 5 is therefore set by the initialization unit 38.

After the setting of the predefined initialization angular position, the initialization unit 38 first reads out the actual pulse polarity value PPn from the data storage 32 and compares the read-out actual pulse polarity value PPn with the target pulse polarity value PP1-4 (here: PP4=1) which is assigned to the respective initialization angular position value W1-4 (here: W4) and which is also read out from the data storage 32.

Consequently, for the example described, the read-out actual pulse polarity value PPn matches the target pulse polarity value PP4 of the set initialization angular position. If this were not the case, the initialization unit 38 would provide the start signal to the drive motor 14 in order to start a rotational movement of the shaft 12, and would stop the rotational movement when the actual angular position value Wn read out from the data storage 32 again matches one of the initialization angular position values W1-4. In this case, the initialization unit 38 would consequently set the next initialization angular position in the direction of rotation (here: W1).

Subsequently, the initialization unit 38 reads out the actual partial rotation count value Un (here: Un=11) from the data storage 32, determines the actual partial subsegment value HSn (here: HSn=1) from the read-out actual partial rotation count value Un, and compares the determined actual subsegment value HSn with the target subsegment value HS1-4 (here: HS4=2) which is assigned to the respective initialization angular position value W1-4 (here: W4) and which is read out from the data storage 32.

For the example described, the determined actual subsegment value HSn consequently does not match the target subsegment value HS4 of the set initialization angular position. The initialization unit 38 therefore increases the actual partial rotation count value Un stored in the data storage 32 by X=N/2=1, i.e., by a value that corresponds to a half rotation. The actual partial rotation count value Un=12 is consequently stored in the data storage 32, which results in the actual subsegment value HSn=2.

After the initialization according to the present invention, the actual partial rotation count value HSn (here: HSn=2) which is determined from the actual partial rotation count value Un (here: Un=12) that is stored in the data storage 32 consequently matches the target subsegment value HS1-4 (here: HS4=2) which corresponds to the set initialization angular position.

The present invention is not limited to embodiments described herein; reference should be had to the appended claims.

REFERENCE LIST 10 rotation angle measuring system
12 shaft
14 drive motor
16 motor housing
18 rotor unit
19 first assembly
20 stator unit
21 second assembly
22 rotor circuit board
24$a$-$d$ excitation magnets
26 stator circuit board
28 Wiegand multiturn sensor
29 singleturn sensor unit
30 optical singleturn sensor
32 data storage
34 integrated circuit
36 evaluation unit
38 Initialization unit
40 fastening device
42 Wiegand wire
D Wiegand wire extension direction
HS1-4 target subsegment value
HSn actual subsegment value
N magnetic north pole
PP1-4 target pulse polarity values
PPn actual pulse polarity value
S magnetic south pole
Un actual partial rotation count value
W1-4 initialization angular position values
Wn actual angular position value

What is claimed is:

1. A method for initializing a rotation angle measuring system, the method comprising:

setting a predefined initialization angular position of a rotor unit relative to a stator unit;

reading an actual partial rotation count value from a data storage, wherein the actual partial rotation count value is equal to a number of partial rotations of the rotor unit relative to the stator unit since a start of the rotation angle measuring system, wherein a partial rotation is defined as 360°/N, where N=2ⁿ, and where n=1,2,3 . . . ;

determining an actual subsegment value from the actual partial rotation count value, wherein the actual subsegment value indicates in which 360°/N subsegment of a full rotation the rotor unit is located relative to the stator unit; and increasing or decreasing the actual partial rotation count value stored in the data storage if the actual subsegment value does not match a target subsegment value which is assigned to the predefined initialization angular position, so as to thereby initialize the rotation angle measuring system.

2. The method as recited in claim 1, wherein, for setting the predefined initialization angular position of the rotor unit relative to the stator unit, the method comprises:

starting a rotational movement of the rotor unit relative to the stator unit;

determining an actual angular position value, wherein the actual angular position value indicates a relative angular position of the rotor unit relative to the stator unit; and comparing the actual angular position value determined with an initialization angular position value which is assigned to the predefined initialization angular position.

3. The method as recited in claim 1, further comprising:

after setting the predefined initialization angular position, reading out from the data storage an actual pulse polarity value which indicates a polarity of a last Wiegand pulse triggered in a Wiegand multiturn sensor;

comparing the actual pulse polarity value read out with a target pulse polarity value which is assigned to a set predefined initialization angular position, and rotating the rotor unit to a next predefined initialization angular position if the actual pulse polarity value does not match the target pulse polarity value which is assigned to the set predefined initialization angular position.

4. A rotation angle measuring system for detecting a rotational movement of a shaft, the rotation angle measuring system comprising:

a rotatable rotor unit which is designed to be mounted so as to rotate with the shaft, the rotatable rotor unit comprising a plurality of permanent-magnetic excitation magnets;

a stationary stator unit comprising a Wiegand multiturn sensor, a data storage, and an evaluation unit;

a singleturn sensor unit which is configured to detect an angular position of the rotatable rotor unit relative to the stationary stator unit; and an initialization unit to which a target subsegment value is predefined, wherein, the evaluation unit is connected to the Wiegand multiturn sensor, to the singleturn sensor unit, and to the data storage, and configured to determine an actual partial rotation count value, which is equal to a number of partial rotations of the rotatable rotor unit relative to the stationary stator unit since a start of the rotation angle measuring system, wherein a partial rotation is defined as 360°/N, where N=2ⁿ, and where n=1,2,3 . . . , and an actual angular position value, which indicates a relative angular position of the rotatable rotor unit relative to the stationary stator unit, and to store the determined actual partial rotation count value and the determined actual angular position value in the data storage, and the initialization unit is configured, to read the actual partial rotation count value from the data storage, to determine an actual subsegment value, which indicates in which 360°/N subsegment of a full rotation the rotatable rotor unit is located relative to the stationary stator unit, from the actual partial rotation count value, and to increase or decrease the actual partial rotation count value stored in the data storage if the actual subsegment value does not match the predefined target subsegment value.

5. The rotation angle measuring system as recited in claim 4, wherein the rotatable rotor unit comprises at least four of the plurality of permanent-magnetic excitation magnets.

6. The rotation angle measuring system as recited in claim 4, further comprising:

a first assembly which constitutes the rotatable rotor unit; and a second assembly which constitutes the stationary stator unit, wherein, the first assembly and the second assembly are configured to be mountable on the shaft one after the other.

* * * * *